US012634760B2

(12) United States Patent
Smith et al.

(10) Patent No.: US 12,634,760 B2
(45) Date of Patent: May 19, 2026

(54) NETWORK INITIATED Wi-Fi STREAM CLASSIFICATION SERVICE

(71) Applicant: Cisco Technology, Inc., San Jose, CA (US)

(72) Inventors: Malcolm Smith, Shaker Heights, OH (US); Indermeet Gandhi, San Jose, CA (US); Saswat Praharaj, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 18/193,725

(22) Filed: Mar. 31, 2023

(65) Prior Publication Data

US 2024/0334249 A1 Oct. 3, 2024

(51) Int. Cl.
*H04W 28/08* (2023.01)
*H04L 47/2441* (2022.01)
*H04W 28/12* (2009.01)

(52) U.S. Cl.
CPC ..... *H04W 28/0967* (2020.05); *H04L 47/2441* (2013.01); *H04W 28/0992* (2020.05); *H04W 28/12* (2013.01)

(58) Field of Classification Search
CPC ..... H04W 28/08; H04W 28/09; H04W 28/02; H04W 28/12; H04W 28/10; H04W 28/24; H04W 36/00; H04W 36/18; H04W 36/24; H04W 36/26; H04W 72/50; H04W 72/53; H04W 72/54; H04W 72/12; H04W 72/56; H04L 47/24; H04L 43/02; H04L 61/45; H04L 67/10
USPC ........................................................ 370/235
See application file for complete search history.

(56) References Cited

U.S. PATENT DOCUMENTS

| | | | | |
|---|---|---|---|---|
| 11,956,336 | B2 * | 4/2024 | Huang | ................. H04W 24/10 |
| 12,004,015 | B2 * | 6/2024 | Canpolat | .............. H04W 76/22 |
| 12,284,552 | B2 * | 4/2025 | Hsu | ..................... H04L 47/2441 |
| 2014/0059186 | A1 | 2/2014 | Omar | |
| 2014/0341098 | A1 | 11/2014 | Cho et al. | |
| 2023/0024093 | A1 * | 1/2023 | Hsu | ...................... H04W 28/24 |
| 2023/0156516 | A1 * | 5/2023 | Chu | ................. H04W 28/0268 |
| | | | | 370/230 |
| 2023/0246970 | A1 * | 8/2023 | Canpolat | ........... H04L 47/2441 |
| | | | | 370/235 |
| 2023/0319620 | A1 * | 10/2023 | Xin | ........................ H04L 47/24 |
| | | | | 370/229 |

(Continued)

FOREIGN PATENT DOCUMENTS

| | | |
|---|---|---|
| WO | 2022146635 A1 | 7/2022 |
| WO | 2022251117 A1 | 12/2022 |
| WO | 2022258821 A1 | 12/2022 |

OTHER PUBLICATIONS

Flaithearta, P.O. "Optimizing the QoS of VoIP Applications over WiFi through use of Synchronized Time"; Thesis Doctor of Philosophy, Jan. 2015; National University of Ireland Galway; Research Gate (214 pages).

*Primary Examiner* — Man U Phan
(74) *Attorney, Agent, or Firm* — Merchant & Gould P.C.

(57) ABSTRACT

Network initiated Wi-Fi Stream Classification Service (SCS) may be provided. SCS flow parameters may first be negotiated. A flow may be provisioned using the SCS flow parameters. A Station (STA) may associate with an Access Point (AP), and the STA may be allowed to communicate with the AP using the flow according to the SCS flow parameters.

17 Claims, 4 Drawing Sheets

(56)            References Cited

U.S. PATENT DOCUMENTS

| | | | |
|---|---|---|---|
| 2024/0090010 A1* | 3/2024 | Ajami ............... | H04W 28/0278 |
| 2024/0098018 A1* | 3/2024 | Li ......................... | H04L 45/302 |
| 2024/0291763 A1* | 8/2024 | Viger ...................... | H04L 47/24 |
| 2024/0292456 A1* | 8/2024 | Ajami .............. | H04W 74/0816 |
| 2025/0063620 A1* | 2/2025 | Huang .................. | H04W 76/15 |
| 2025/0227537 A1* | 7/2025 | Huang .............. | H04W 28/0268 |

* cited by examiner

305

Start

310

Negotiate SCS flow parameters

320

Provision a flow using the SCS flow parameters

330

Determine a STA associates with an AP

340

Allow the STA to communicate with the AP using the flow according
to the SCS flow parameters End

350

NETWORK INITIATED Wi-Fi STREAM CLASSIFICATION SERVICE

TECHNICAL FIELD

The present disclosure relates generally to providing network initiated Wi-Fi Stream Classification Service (SCS).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
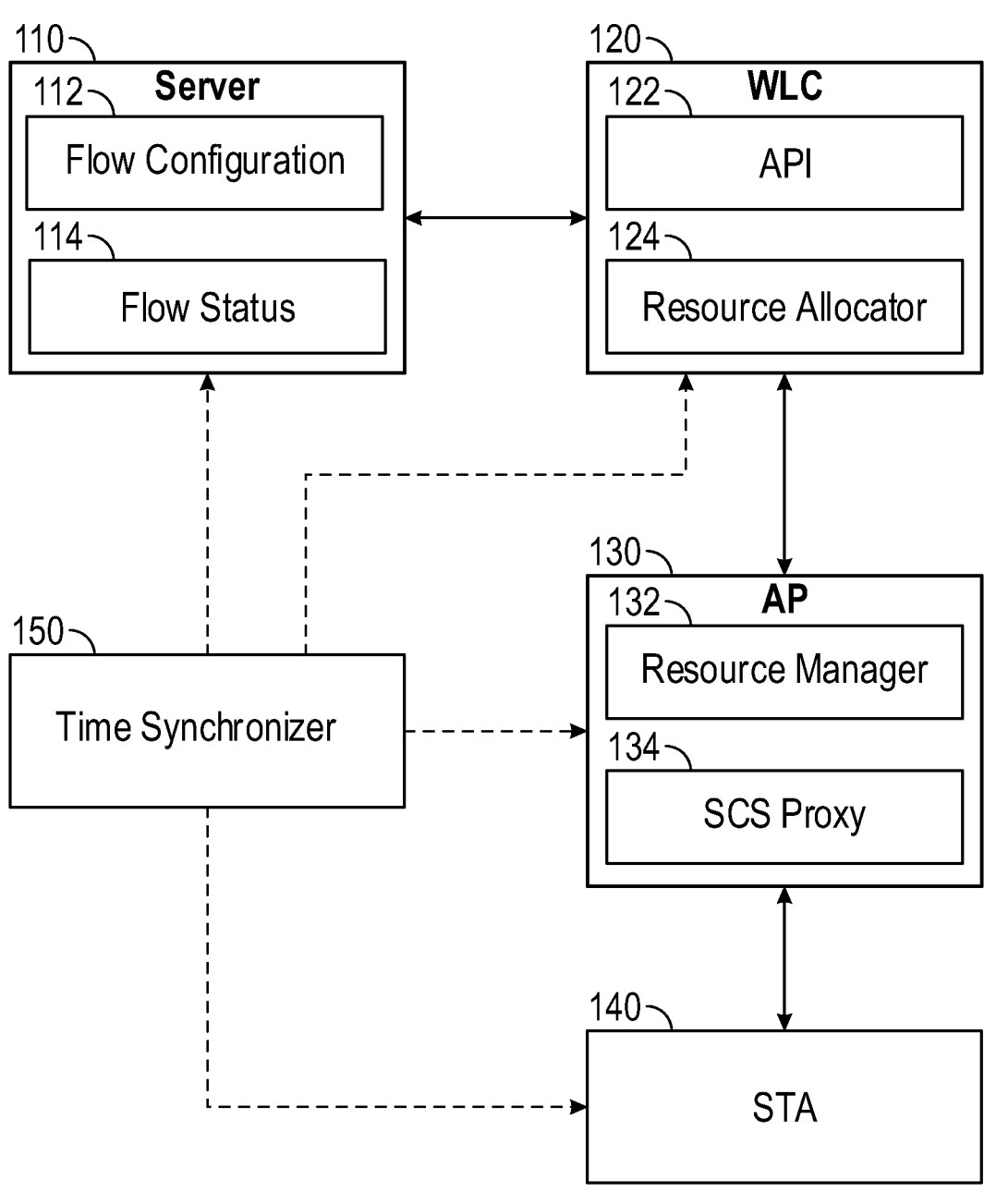
FIG. 1 is a block diagram of an operating environment for network initiated providing Wi-Fi Stream Classification Service (SCS)

Network initiated Wi-Fi Stream Classification Service (SCS) may be provided. SCS flow parameters may first be negotiated. A flow may be provisioned using the SCS flow parameters. A Station (STA) may associate with an Access Point (AP), and the STA may be allowed to communicate with the AP using the flow according to the SCS flow parameters.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Wi-Fi Stream Classification Service (SCS) is a mechanism to signal an application's Service Level Agreement (SLA) requirements (e.g., latency) to the network. As defined by Wi-Fi 7, both Uplink (UL) and Downlink (DL) flows can be specified by a Station (STA) to an Access Point (AP), during association and roaming for example. Both UL and DL can be used by the network (e.g., by the AP) to maximize Quality of Service (QoS). However, the STA may not be capable of specifying one of the directions (typically DL) because the STA is not the source of that traffic flow. This limitation of the STA to specify only one direction of flow may limit the usability of the SCS mechanism. Activation of SCS rules may be initiated by the client device (e.g., a STA) sending an SCS request frame to an AP post-association. The activation of SCS rules may cause the STA to be assigned DL Internet Protocol (IP) flows to the desired access categories.

If a client device has activated one or more SCS rules with an AP and then roams to another Basic Service Set (BSS) in the network and the client device desires to continue to use those SCS rules, the client device may have to request activation of the SCS rules with the new AP in the target BSS immediately after the roaming association or reassociation. The client device may be required to request activation of the SCS rules regardless of whether the target BSS is operated by the same physical AP the client device was previously connected to. The requirement for requesting activation of SCS rules when switching to another BSS may result in inefficient operation, unnecessary packet loss, delay, and the like.

FIG. 1 is a block diagram of an operating environment 100 for providing network initiated Wi-Fi SCS. The operating environment 100 includes a server 110, a Wireless Local Area Network Controller (WLC) 120, an Access Point (AP) 130, a Station (STA) 140, and a time synchronizer 150. The server 110 may include a flow configuration 112 and a flow status 114. The WLC 120 may include an Application Programming Interface (API) 122 and a resource allocator 124. The AP 130 may include a resource manager 132 and an SCS proxy 134. Some components of the operating environment 100 may be in the cloud (e.g., servers that may be accessed remotely, via the internet for example) and/or the edge-cloud (e.g., distributed servers located closer to sources or data and that may be accessed remotely). For example, the server 110 may be in the cloud and/or the edge-cloud. The WLC 120, the AP 130, and the STA 140 may operate in a Wireless Local Area Network (WLAN).

The time synchronizer 150 may synchronize the clocks of the components in the operating environment 100 (e.g., the server 110, the WLC 120, the AP 130, and/or the STA 140). Synchronizing the clocks may ensure the correct operation of the components, such as by complying with the Institute of Electrical and Electronics Engineers (IEEE) 802.1AS standard.

The API 122 may be a set of rules that devices how applications and/or devices can connect to and communicate each other, including rules for using SCS for example. The API 122 may be a Representational State Transfer (REST) API in some examples. Additionally, the API 122 may be accessed on a dashboard and/or other tool for monitoring and/or configuring devices of a network. For example, applications in the network, such as in the cloud and/or the edge-cloud, can use the API 122 to specify SCS protocol parameters defined in Wi-Fi 7 on behalf of STAs, such as the STA 140.

The server 110 may communicate with the WLC 120 to access the API 122 and specify DL and/or UL SCS flow parameters for either (i) a specific flow supported at a STA (e.g., a particular Media Access Control (MAC) address and/or IP address) or (ii) a class of flows supported by a class of STAs (e.g., a range of MAC addresses, multiple Organizationally Unique Identifiers (OUIs), an IP domain, etc.). The DL and/or UL SCS flow parameters may include Delay Bound, Scheduling Interval (SI), QoS mapping (e.g. Differentiated Services Code Point (DSCP), User Priority (UP), Traffic Identifier (TID)), and/or the like. The class of flows may need to have similar characteristics to have DL and/or UL SCS flows specified for the class of flows. In some examples, the server 110 may be an application server that hosts applications and/or other software.

Unlike the SCS methods described by Wi-Fi 7 (i.e., provision flows sent by STAs to APs), the server 110 may provision SCS flow parameters for one or more flows for STAs before the STAs associate with an AP. For example, the server 110 may provision the flows of the STA 140 before the STA 140 associates with the AP 130. The server 110 may also pre-negotiate the SCS provisions using the API 122.

When the STA 140 associates with or otherwise joins the AP 130, the STA 140 may request unique (e.g., per-STA) SCS parameters that can be combined or otherwise merged with pre-existing, network-initiated SCS parameters. Additionally, the set of composite SCS flows can be sent by the AP 130 to inform the STA 140 of all the active SCS sessions (e.g., via SCS Update/Modify). In addition, the AP 130 may also signal resources that may have been allocated to fulfill the SCS request (e.g., STA-AP communication scheduling via Target Wake Time (TWT) and/or restricted-TWT (r-TWT)) to the STA 140 via a corresponding network-initiated mechanism.

When the STA 140 roams or otherwise re-associates to another AP (e.g., associating from the AP 130 to a different AP), the STA 140 does not need to renegotiate the SCS parameters with the target AP (i.e., the AP the STA 140 is associating with or otherwise connecting to) because the pre-established SCS sessions can be immediately updated (e.g. by SCS ID), such as by the target AP. For example, the target AP may receive the pre-established SCS sessions from the WLC 120. In other examples, the STA 140 may have access to the SCS ID that details the pre-established SCS sessions, and the STA 140 may include the SCS ID in the reassociation request. The target AP may confirm the flows of the pre-established SCS sessions associated with the SCS ID (e.g., to confirm the SCS ID the STA 140 has and/or the associated flows are still valid), any network-initiated flows in the reassociation response, and/or follow-on SCS Update/

Modify. Therefore, the STA 140 does not have to perform an SCS request transaction, which may save time, reduce overhead, and/or prevent losses of scheduled Transmit Opportunities (TXOPs).

Figure 2:
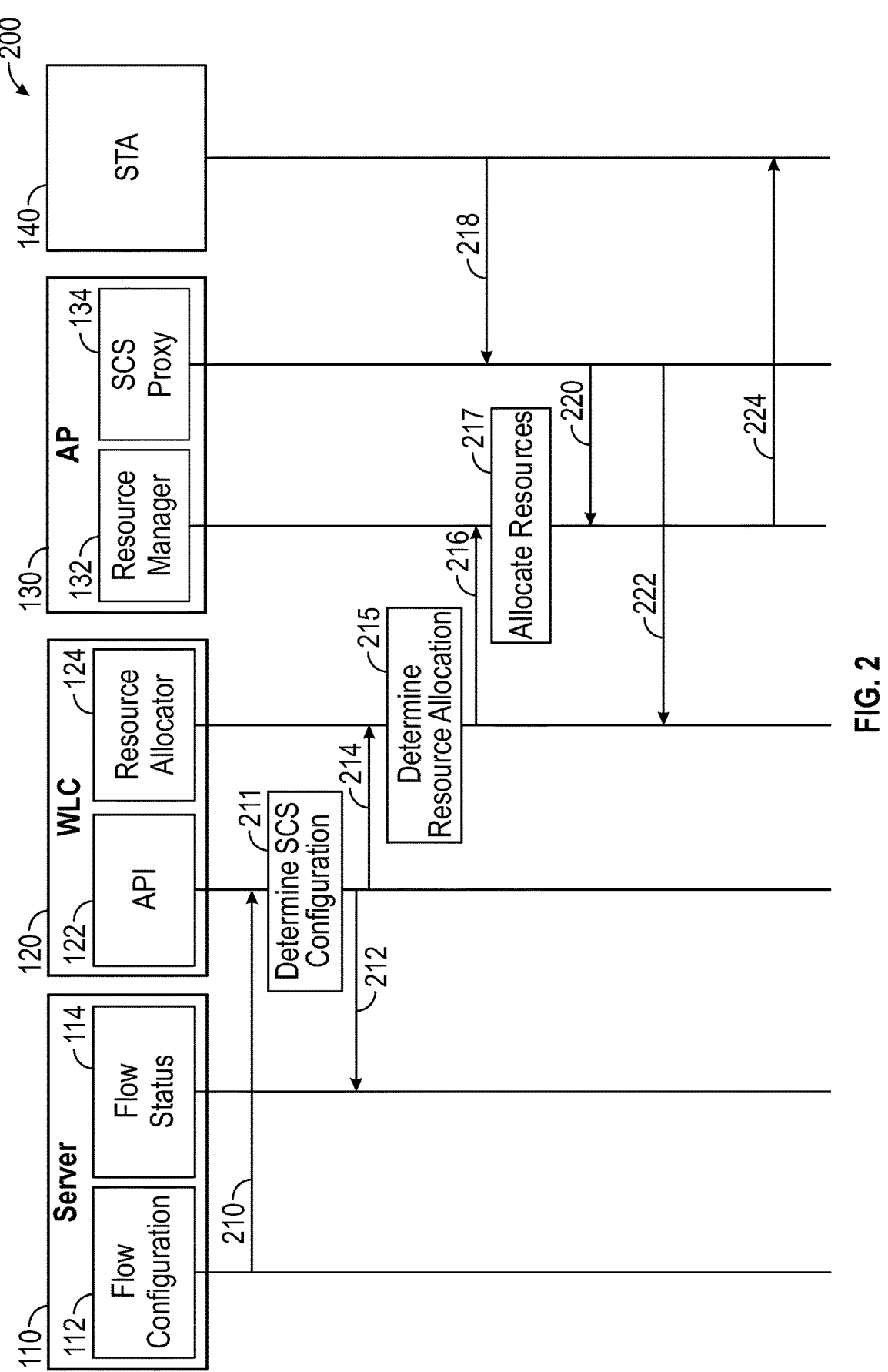
FIG. 2 is a block diagram of a signaling process for providing network initiated Wi-Fi SCS.

FIG. 2 is a block diagram of a signaling process 200 for providing network initiated Wi-Fi SCS. The signaling process 200 may begin with signal 210. Signal 210 may be an SCS configuration request from the flow configuration 112 to the API 122. The configuration request may specify DL and/or UL SCS flow parameters for either a specific flow supported at a STA or (ii) a class of flows supported by a class of STAs. In some examples, the server 110 and the WLC 120 may negotiate the requested configurations, so more signals not shown in FIG. 2 may be exchanged between the server 110 and the WLC 120 to determine the accepted configuration. The negotiation may be based on network policy and/or resource availability. In operation 211, the API 122 may determine and/or approve the flow configuration requested in signal 210. The API 122 may send the signal 212 to the flow status 114 informing the flow status 114 that the SCS request has been approved and will be allocated.

Signal 214 may be an instruction, from the API 122 to the resource allocator 124, to allocate resources based on the SCS configuration determined in operation 211 in response to the signal 210. In operation 215, the resource allocator 124 may allocate resources based on the SCS configuration. For example, the resource allocator 124 may determine the AP 130 and/or additional APs should allocate slots for communication based on the SCS request.

The resource allocator 124 may send signal 216 to resource manager 132 instructing the resource manager 132 to allocate slots for communication based on the SCS request. The signal 216 may include start times, durations, and/or periods for the slots to be allocated. In operation 217, the resource manager 132 may cause the AP 130 to allocate slots based on the signal 216.

The STA 140 may send signal 218 to the SCS proxy 134 requesting to associate with the AP 130 and/or requesting an SCS configuration (e.g., using an SCS ID). The SCS proxy 134 may send signal 220 to the resource manager 132 instructing the resource manager 132 to confirm the resource allocation and align flows for the STA 140. In some examples, the SCS proxy 134 may notify the resource allocator 124, using signal 222, of the signal 218 that is received, and the resource allocator 124 may confirm the SCS configuration is valid and/or cause the resource manager 132 to update the resource allocation.

In response to the signal 220, the resource manager 132 may send signal 224 to the STA 140 confirming the resource allocation according to the SCS configuration and/or align the flows (e.g., start times, durations, periods, etc.). Thus, the STA 140 may begin communicating with the AP 130 using pre-existing SCS parameters.

Figure 3:
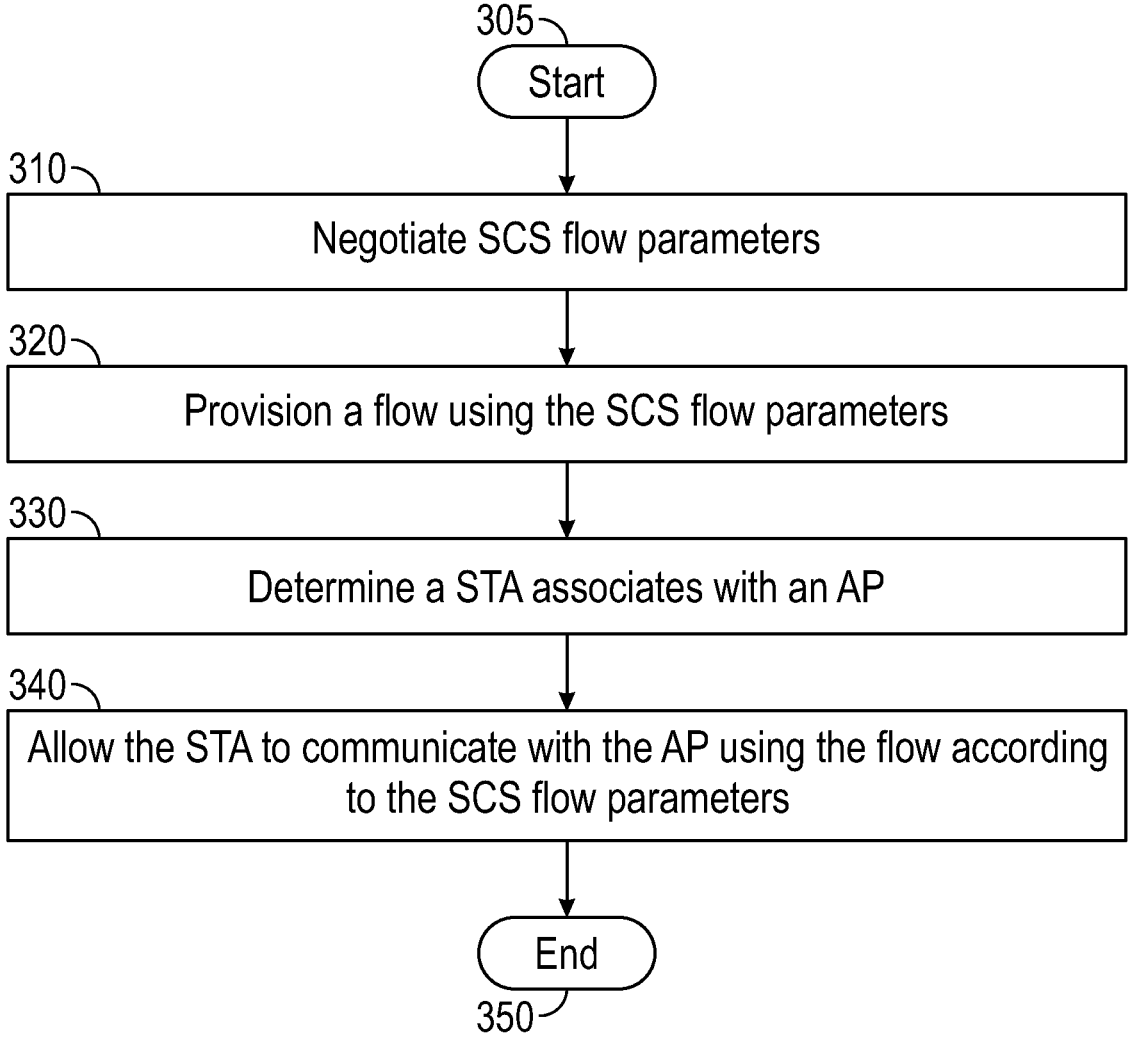
FIG. 3 is a flow chart of a method for providing network initiated Wi-Fi SCS.

FIG. 3 is a flow chart of a method 300 for providing network initiated Wi-Fi SCS. The method 300 may begin at starting block 305 and proceed to operation 310. In operation 310, Stream Classification Service flow parameters may be negotiated. For example, the server 110 may send an SCS request to the API 122 that includes UL and/or DL SCS flow parameters for either (i) a specific flow supported at a STA or (ii) a class of flows supported by a class of STAs. The API 122 may approve the request or negotiate with the server 110 to modify the SCS flow parameters. For example, the API 122 may need to modify the SCS flow parameters based on resource availability, network policy, and/or the like.

In operation 320, a flow may be provisioned using the SCS flow parameters. For example, the WLC 120 may cause the AP 130 to provision a flow based on the SCS parameters.

In operation 330, it may be determined that STA associates with an AP. For example, the STA 140 may associate with the AP 130.

In operation 340, the STA may be allowed to communicate with the AP using the flow according to the SCS flow parameters. For example, the STA 140 may communicate with the AP 130 using the flow. The method 300 may conclude at ending block 350.

Figure 4:
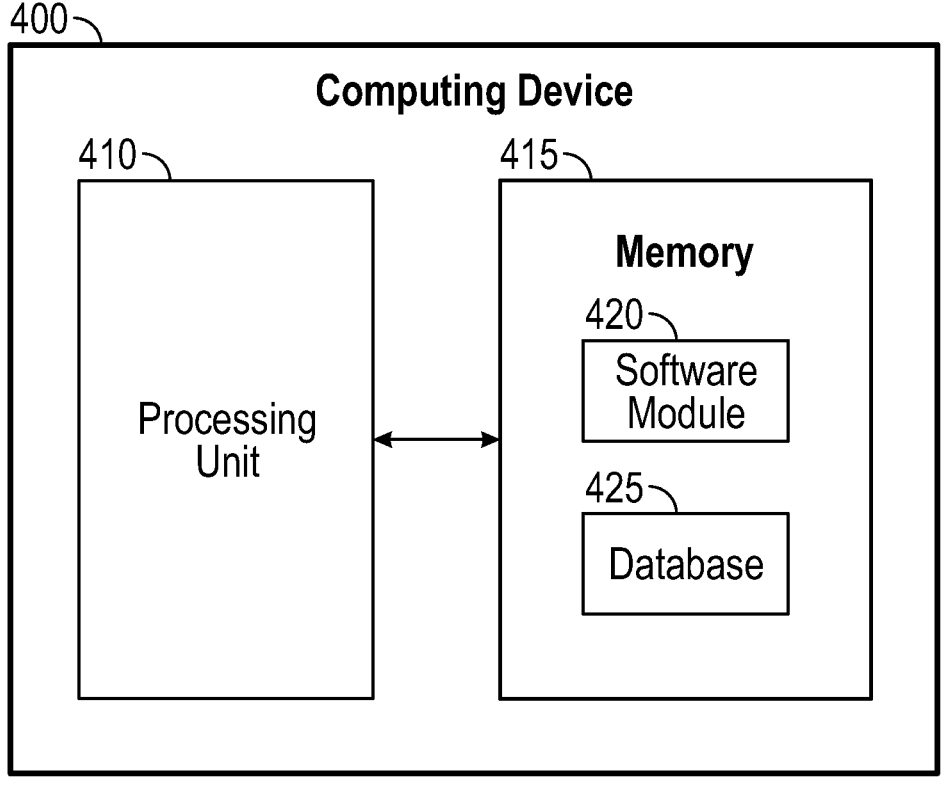
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing network initiated Wi-Fi SCS with respect to FIG. 1, FIG. 2, and FIG. 3. Computing device 400, for example, may provide an operating environment for the server 110, the flow configuration 112, the flow status 114, the WLC 120, the API 122, the resource allocator 124, the AP 130, the resource manager 132, the SCS proxy 134, the STA 140, the time synchronizer 150, and the like. The server 110, the flow configuration 112, the flow status 114, the WLC 120, the API 122, the resource allocator 124, the AP 130, the resource manager 132, the SCS proxy 134, the STA 140, the time synchronizer 150, and the like may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method for providing network initiated Wi-Fi Stream Classification Service (SCS), the method comprising:
negotiating, by a computing device, SCS flow parameters;
provisioning, by the computing device, a flow using the SCS flow parameters;
determining, by a computing device, a Station (STA) associates with an Access Point (AP);
allowing, by the computing device, the STA to communicate with the AP using the flow according to the SCS flow parameters;
receiving, by the computing device, a request for unique SCS parameters from the STA; and
merging, by the computing device, the unique SCS parameters with the SCS flow parameters to generate merged flows.

2. The method of claim 1, wherein the SCS flow parameters include any one of (i) a delay bound, (ii) a Scheduling Interval (SI), (iii) a Quality of Service (QoS) mapping, or (iv) any combination of (i)-(iii).

3. The method of claim 1, wherein the SCS flow parameters are for a specific flow supported at the STA or for a class of flows supported by a class of STAs.

4. The method of claim 1, further comprising:
informing the STA of active SCS sessions by sending the merged SCS flows to the STA.

5. The method of claim 1, further comprising:
receiving a request from the STA to associate with a second AP; and
updating the SCS flow parameters based on the association with the second AP.

6. The method of claim 1, further comprising:
receiving a request from the STA to associate with a second AP, wherein the request includes a SCS ID identifying the SCS flow parameters; and
confirming the SCS flow parameters identified by the SCS ID.

7. A system for providing network initiated Wi-Fi Stream Classification Service (SCS), the system comprising:
a memory storage; and
a processing unit coupled to the memory storage, wherein the processing unit is operative to:
negotiate SCS flow parameters;
provision a flow using the SCS flow parameters;
determine a Station (STA) associates with an Access Point (AP);
allow the STA to communicate with the AP using the flow according to the SCS flow parameters;
receive a request from the STA to associate with a second AP, wherein the request includes a SCS ID identifying the SCS flow parameters; and
confirm the SCS flow parameters identified by the SCS ID.

8. The system of claim 7, wherein the SCS flow parameters include any one of (i) a delay bound, (ii) a Scheduling Interval (SI), (iii) a Quality of Service (QoS) mapping, or (iv) any combination of (i)-(iii).

9. The system of claim 7, wherein the SCS flow parameters are for a specific flow supported at the STA or for a class of flows supported by a class of STAs.

10. The system of claim 7, the processing unit being further operative to:
receive a request for unique SCS parameters from the STA; and
merge the unique SCS parameters with the SCS flow parameters to generate merged SCS flows.

11. The system of claim 10, the processing unit being further operative to: inform the STA of active SCS sessions by sending the merged SCS flows to the STA.

12. The system of claim 7, the processing unit being further operative to: receive a request from the STA to associate with a second AP; and
update the SCS flow parameters based on the association with the second AP.

13. A non-transitory computer-readable medium that stores a set of instructions which when executed perform a method for providing network initiated Wi-Fi Stream Classification Service (SCS), the method executed by the set of instructions comprising:
negotiating SCS flow parameters;
provisioning a flow using the SCS flow parameters;
determining a Station (STA) associates with an Access Point (AP);
allowing the STA to communicate with the AP using the flow according to the SCS flow parameters;
receiving a request from the STA to associate with a second AP; and
updating the SCS flow parameters based on the association with the second AP.

14. The non-transitory computer-readable medium of claim 13, wherein the SCS flow parameters include any one of (i) a delay bound, (ii) a Scheduling Interval (SI), (iii) a Quality of Service (QoS) mapping, or (iv) any combination of (i)-(iii).

15. The non-transitory computer-readable medium of claim 13, wherein the SCS flow parameters are for a specific flow supported at the STA or for a class of flows supported by a class of STAs.

16. The non-transitory computer-readable medium of claim 13, the method executed by the set of instructions further comprising:
receiving a request for unique SCS parameters from the STA; and
merging the unique SCS parameters with the SCS flow parameters to generate merged SCS flows.

17. The non-transitory computer-readable medium of claim 16, the method executed by the set of instructions further comprising:
informing the STA of active SCS sessions by sending the merged SCS flows to the STA.

* * * * *